US012780035B2

(12) United States Patent
Huh

(10) Patent No.: US 12,780,035 B2
(45) Date of Patent: Nov. 3, 2026

(54) STAY MODE CONTROL SYSTEM AND METHOD OF ELECTRIFIED VEHICLE

(71) Applicants: HYUNDAI MOTOR COMPANY, Seoul (KR); KIA CORPORATION, Seoul (KR)

(72) Inventor: Jee Wook Huh, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/213,033

(22) Filed: May 20, 2025

(65) Prior Publication Data

US 2026/0158963 A1 Jun. 11, 2026

(30) Foreign Application Priority Data

Dec. 9, 2024 (KR) ........................ 10-2024-0181147

(51) Int. Cl.
*B60L 58/12* (2019.01)
*B60L 1/00* (2006.01)

(52) U.S. Cl.
CPC ............... *B60L 58/12* (2019.02); *B60L 1/003* (2013.01); *B60L 2240/62* (2013.01); *B60L 2250/16* (2013.01); *B60L 2250/26* (2013.01); *B60L 2260/22* (2013.01); *B60L 2260/26* (2013.01)

(58) Field of Classification Search
CPC ...... B60L 58/12; B60L 1/003; B60L 2240/62; B60L 2250/16; B60L 2250/26; B60L 2260/22; B60L 2260/26
See application file for complete search history.

(56) References Cited

U.S. PATENT DOCUMENTS

| | | | | |
|---|---|---|---|---|
| 9,386,446 | B1 * | 7/2016 | Bernstein | H04W 48/04 |
| 2013/0151097 | A1 * | 6/2013 | Deurloo | F16H 61/16 701/62 |
| 2017/0088003 | A1 * | 3/2017 | Yu | B60W 10/08 |

* cited by examiner

*Primary Examiner* — Behrang Badii
(74) *Attorney, Agent, or Firm* — MCDONNELL BOEHNEN & BERGHOFF LLP

(57) ABSTRACT

A stay mode control system and method of an electrified vehicle is capable of automatically executing a stay preparation mode entrance procedure when the vehicle starts. The system further includes a stay mode entrance procedure for guiding whether or not entrance to a stay mode is desired when the vehicle is parked or stopped or arrives at a place for stay mode availability, and executing the stay mode when entrance to the stay mode is selected. The system further includes a stay mode control procedure for executing functions required in the stay mode, and a procedure for releasing the stay mode when a predetermined time exceeds after entrance to the stay mode control or there is gear shift manipulation or the like. Accordingly, it may be possible to enhance convenience of stay mode use and marketability.

20 Claims, 3 Drawing Sheets

STAY MODE CONTROL SYSTEM AND METHOD OF ELECTRIFIED VEHICLE

CROSS REFERENCE TO RELATED APPLICATIONS

This application claims priority, under 35 U.S.C. § 119(a), to Korean Patent Application No. 10-2024-0181147 filed on Dec. 9, 2024, the entire contents of which are incorporated herein by reference.

BACKGROUND

(a) Technical Field

The present disclosure relates to a stay mode control system and method of an electrified vehicle, which is configured to automatically execute entrance to the stay mode, operation of the stay mode and release of the stay mode.

(b) Background Art

Generally, vehicles using a motor alone, for example, a battery electric vehicle (BEV) using a battery as a drive power source (an electric power source) and a fuel cell electric vehicle (FCEV) using a fuel cell as a main drive power source, vehicles using composite drive power of a motor and an engine, for example, a hybrid electric vehicle (HEV) configured to enable only recharge of a battery through an electric power generation device thereof and a plug-in hybrid electric vehicle (PHEV) configured to enable external recharge of a battery thereof through connection thereof to an external power supply device, etc. are referred to as "electrified vehicles".

Although it is true that such an electrified vehicle has a limitation on market penetration due to charging infrastructure, vehicle price, etc., many users prefer the electrified vehicle in terms of not only quietness and comfort, but also driving performance, because driving of the electrified vehicle is possible using only a motor.

In particular, a stay mode of an electrified vehicle which enables the vehicle to be utilized as an indoor residence space for rest, sleeping, hobbies, etc., rather than only as a simple transportation means, is being researched and developed. The research takes into consideration an increased frequency of the vehicle user to take a break while staying in the interior of the vehicle in a parked state of the vehicle, to use a multimedia device including an audio device, an air conditioner, electrical appliances such as a game console, a smartphone, etc., and various electrical devices such as electrical outlets, etc. in the vehicle.

For example, in order to enable the user to take a break or stay while using electrical devices without worry about battery recharge in a particular place for a stay mode, various methods associated with a stay mode capable of previously managing a state of charge (SoC) of a battery at a higher level than a reference level before the vehicle arrives at the particular place for the stay mode and automatically achieving battery power use amount control, seat relaxation control, etc. for rest, sleeping, hobbies, etc. when the vehicle has arrived in the particular place for the stay mode are being researched and developed.

Conventionally, however, there is no control technology associated with the stay mode. Furthermore, there is no separate control for entrance to the stay mode, operation of the stay mode, and release of the stay mode. For this reason, the frequency with which the user utilizes the stay mode may be lowered and, as such, marketability of stay mode technology may be degraded.

SUMMARY

The present disclosure has been made in an effort to solve the above-described problems associated with the prior art, and an object of the present disclosure is to provide a stay mode control system and method of an electrified vehicle, which is configured to automatically execute a stay preparation mode entrance procedure when the vehicle starts, a stay mode entrance procedure for guiding whether or not entrance to the stay mode is desired and executing the stay mode when entrance to the stable mode is selected, a stay mode control procedure for executing functions required in the stay mode, a procedure for releasing the stay mode after a predetermined time elapses from entrance to the stay mode control or when shift operation or the like is carried out, thereby being capable of enhancing convenience of stay mode use and marketability of stay mode technology.

Objects of the present disclosure are not limited to the above-described objects, and other objects of the present disclosure not yet described will be more clearly understood by those skilled in the art from the following detailed description. In addition, objects of the present disclosure may be accomplished by means defined in the appended claims and combinations thereof.

In one aspect, the present disclosure provides a stay mode control system of an electrified vehicle including a stay preparation mode controller configured to determine whether or not all controllers necessary for a stay mode are in a normal state, when the vehicle starts, a stay mode entrance controller configured to execute control for informing a driver that the stay mode is in preparation, control for stay mode preparation, and control for determining whether or not entrance to the stay mode is desired, a stay mode operation controller configured to execute control for informing of a stay mode entrance state, control for switching the vehicle to a driving disabled state, and control for executing functions required in the stay mode, and a stay mode release controller configured to execute stay mode release control when a predetermined stay mode time ends or in accordance with a stay mode release intention of the driver.

In an embodiment, the stay preparation mode controller may be configured to recognize, as a vehicle start state, a ready state of the vehicle that is a driving waiting state according to depression of a start button by the driver and to determine that all controllers necessary for the stay mode are in a normal state, upon receiving normal output signals from the controllers necessary for the stay mode.

In another embodiment, the stay preparation mode controller may be configured to not only execute stay mode availability notification control for activating a button enabling the driver to manipulate the stay mode or displaying stay mode availability on a display device in the form of a modal popup, but also to execute stay mode function description notification control for displaying a function description of the stay mode on the display device in the form of a modal popup, when all the controllers necessary for the stay mode are in a normal state.

In still another embodiment, the control for informing that the stay mode is in preparation, which is executed by the stay mode entrance controller, may include a procedure for displaying, on a display device, that the stay mode is in preparation, in the form of a modal popup, in order to enable the driver to recognize that the stay mode is in preparation.

In yet another embodiment, the control for stay mode preparation, which is executed by the stay mode entrance controller, may include a procedure for operating a part of functions required in the stay mode before the vehicle arrives at a place for the stay mode.

In yet another embodiment, the control for determining whether or not entrance to the stay mode is desired, which is executed by the stay mode entrance controller, may include a procedure for displaying, on a display device, information representing whether or not entrance to the stay mode is desired, upon receiving, from a shift controller, a signal indicating that a gear shift is at a P stage or receiving, from a navigation device, a signal indicating that the vehicle has arrived at a place for the stay mode.

In yet another embodiment, the stay mode entrance controller may be configured to execute control for displaying, on a display device, a reason why entrance to the stay mode is disabled, when entrance to the stay mode is disabled, and releasing the stay mode.

In another further embodiment, the control for informing of a stay mode entrance state, which is executed by the stay mode operation controller, may include a procedure for displaying the stay mode entrance state on a display device, and the control for executing functions required in the stay mode, which is executed by the stay mode operation controller, may include a procedure for operating an electronic parking brake, and a procedure for driving electric parts and convenience devices usable in the stay mode among all electric parts and all convenience devices.

In another further embodiment, the stay mode release controller may be configured to execute stay mode release control including a procedure for displaying stay mode release on a display device, a procedure for sending, to a brake controller, a command signal for controlling the brake controller to release operation of an electronic parking brake, and a procedure for sending, to a shift controller, a command signal for controlling the shift controller to change a gear shift to a P stage or maintain the gear shift at the P stage, when the predetermined stay mode time ends.

In yet another further embodiment, the stay mode release controller may be configured to execute stay mode release control including a procedure for displaying stay mode release on a display device, a procedure for sending, to a brake controller, a command signal for controlling the brake controller to release operation of an electronic parking brake, and a procedure for sending, to a shift controller, a command signal for controlling the shift controller to change a gear shift to a P stage or maintain the gear shift at the P stage, when the stay mode release controller receives a shift lever manipulation signal by the driver from the shift controller or a brake manipulation signal by the driver from a brake pedal sensor.

In another aspect, the present disclosure provides a stay mode control method of an electrified vehicle including determining, by a stay preparation mode controller, whether or not all controllers necessary for a stay mode are in a normal state, when the vehicle starts, executing, by a stay mode entrance controller, control for informing a driver that the stay mode is in preparation, control for stay mode preparation, and control for determining whether or not entrance to the stay mode is desired, executing, by a stay mode operation controller, control for informing of a stay mode entrance state, control for switching the vehicle to a driving disabled state, and control for executing functions required in the stay mode, and executing, by a stay mode release controller, stay mode release control when a predetermined stay mode time ends or in accordance with a stay mode release intention of the driver.

In an embodiment, the stay preparation mode controller may recognize, as a vehicle start state, a ready state of the vehicle that is a driving waiting state according to depression of a start button by the driver, and may determine that all controllers necessary for the stay mode are in a normal state, upon receiving normal output signals from the controllers necessary for the stay mode.

In another embodiment, when all the controllers necessary for the stay mode are in a normal state, stay mode availability notification control for activating a button enabling the driver to manipulate the stay mode or displaying stay mode availability on a display device in the form of a modal popup, and stay mode function description notification control for displaying a function description of the stay mode on the display device in the form of a modal popup may be executed by the stay preparation mode controller.

In still another embodiment, the control for informing that the stay mode is in preparation, which is executed by the stay mode entrance controller, may include a procedure for displaying, on a display device, that the stay mode is in preparation, in the form of a modal popup, in order to enable the driver to recognize that the stay mode is in preparation.

In yet another embodiment, the control for stay mode preparation, which is executed by the stay mode entrance controller, may include a procedure for operating a part of functions required in the stay mode before the vehicle arrives at a place for the stay mode.

In yet another embodiment, the control for determining whether or not entrance to the stay mode is desired, which is executed by the stay mode entrance controller, may include a procedure for displaying, on a display device, information representing whether or not entrance to the stay mode is desired, upon receiving, from a shift controller, a signal indicating that a gear shift is at a P stage or receiving, from a navigation device, a signal indicating that the vehicle has arrived at a place for the stay mode.

In another further embodiment, the stay mode entrance controller may execute control for displaying, on a display device, a reason why entrance to the stay mode is disabled, when entrance to the stay mode is disabled, and releases the stay mode.

In yet another further embodiment, the control for informing of a stay mode entrance state, which is executed by the stay mode operation controller, may include a procedure for displaying the stay mode entrance state on a display device, and the control for executing functions required in the stay mode, which is executed by the stay mode operation controller, may include a procedure for operating an electronic parking brake, and a procedure for driving electric parts and convenience devices usable in the stay mode among all electric parts and all convenience devices.

In yet another further embodiment, the executing stay mode release control may include a procedure for displaying stay mode release on a display device, a procedure for sending, to a brake controller, a command signal for controlling the brake controller to release operation of an electronic parking brake, and a procedure for sending, to a shift controller, a command signal for controlling the shift controller to change a gear shift to a P stage or maintain the gear shift at the P stage, when the predetermined stay mode time ends.

In still yet another further embodiment, the executing stay mode release control may include a procedure for displaying stay mode release on a display device, a procedure for sending, to a brake controller, a command signal for controlling the brake controller to release operation of an electronic parking brake, and a procedure for sending, to a shift controller, a command signal for controlling the shift controller to change a gear shift to a P stage or maintain the gear shift at the P stage, upon receiving a shift lever manipulation signal by the driver from the shift controller or a brake manipulation signal by the driver from a brake pedal sensor.

Other aspects and preferred embodiments of the disclosure are discussed infra.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
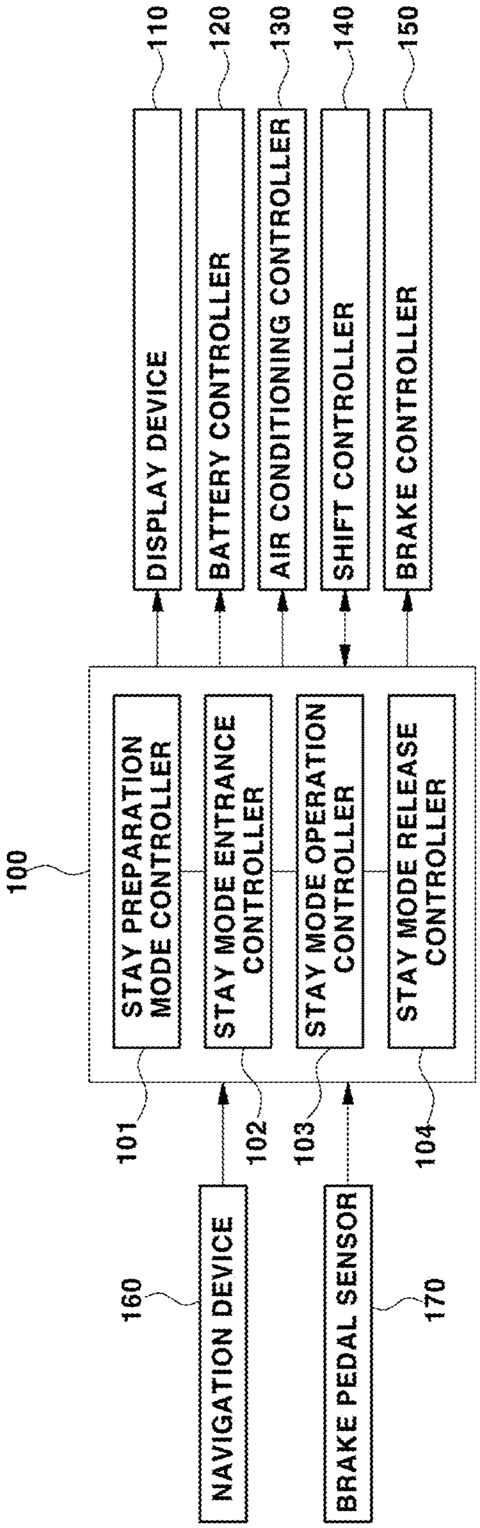
FIG. 1 is a control configuration diagram showing a stay mode control system of an electrified vehicle according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

For embodiments of the present disclosure disclosed herein, specific structural or functional descriptions are exemplary to merely describe the embodiments of the present disclosure, and the embodiments of the present disclosure can be implemented in various forms. In addition, the present disclosure should not be interpreted as being limited to the embodiments described in the present specification, and it should be understood that the present disclosure includes all changes, equivalents, or substitutions within the spirit and scope of the present disclosure.

It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element.

In the case where an element is "connected" or "linked" to another element, it should be understood that the element may be directly connected or linked to the other element, or another element may be present therebetween. On the contrary, in the case where an element is "directly connected" or "directly linked" to another element, it should be understood that no other element is present therebetween. Other expressions describing a relationship between constituent elements, such as "between" and "immediately between", or "adjacent to" and "directly adjacent to", and the like, should be construed in a similar manner.

Throughout the specification, the same reference numerals will refer to the same elements. It should be noted that terms used herein are merely used to describe a specific embodiment, not to limit the present disclosure. Incidentally, unless clearly used otherwise, singular expressions include a plural meaning. In this application, the term "comprises" and/or "comprising" is intended to express the existence of the mentioned constituent element, step, operation, and/or device, and does not exclude the existence or addition of another constituent element, step, operation, and/or device.

Hereinafter, a preferred embodiment of the present disclosure will be described in detail with reference to the accompanying drawings.

FIG. 1 is a control configuration diagram showing a stay mode control system of an electrified vehicle according to the present disclosure.

As shown in FIG. 1, a vehicle controller 100, which is a host controller of an electrified vehicle, is configured through inclusion of a stay preparation mode controller 101, a stay mode entrance controller 102, a stay mode operation controller 103, a stay mode release controller 104, etc.

The stay preparation mode controller 101 is configured to determine whether or not all controllers necessary for a stay mode are in a normal state, when the vehicle starts.

For example, the stay preparation mode controller 101 may be configured to recognize a ready state of the vehicle as a vehicle start state and to determine that all controllers necessary for the stay mode are in a normal state, upon receiving normal output signals from the controllers necessary for the stay mode.

In more detail, when the driver in the vehicle presses a start button, the vehicle enters a ready state in which the vehicle can be driven. The stay preparation mode controller 101 may recognize the ready state as a vehicle start state. When normal output signals are output from the controllers necessary for the stay mode to the stay preparation mode controller 101, the stay preparation mode controller 101 may determine that all the controllers necessary for the stay mode are in a normal state.

In this case, the controllers necessary for the stay mode include not only the vehicle controller, which is a host controller, but also a battery controller, a shift controller, an air conditioning controller, a brake controller, etc., which are sub-controllers.

In addition, the stay preparation mode controller 101 is configured to not only recognize a vehicle start condition, but also to execute stay mode availability notification control when all the controllers necessary for the stay mode are in a normal state.

For example, when the stay preparation mode controller 101 recognizes the vehicle start condition and all the controllers necessary for the stay mode are in a normal state, the stay preparation mode controller 101 may execute the stay mode availability notification control to activate a button enabling the driver to manipulate the stay mode, to display stay mode availability on a display device 110 in the form of a modal popup, or the like.

In addition, the stay preparation mode controller 101 is configured to execute stay mode function description notification control when the stay preparation mode controller 101 recognizes the vehicle start condition and all the controllers necessary for the stay mode are in a normal state.

For example, when the stay preparation mode controller 101 recognizes the vehicle start condition and all the controllers necessary for the stay mode are in a normal state, the stay preparation mode controller 101 may execute the stay mode function description notification control to display a simple function description of the stay mode on the display device 110 in the form of a modal popup for a driver unfamiliar with the stay mode.

In this case, the display device 110 may be a cluster or a display for audio, video, and navigation (AVN).

The stay mode entrance controller 102 is configured to execute control for informing the driver that the stay mode is in preparation, control for stay mode preparation and control for determining whether or not entrance to the stay mode is desired, during driving of the vehicle.

For example, the control for informing that the stay mode is in preparation, which is executed by the stay mode entrance controller 102, may be constituted by a procedure for displaying, on the display device 110, that the stay mode is in preparation, in the form of a modal popup, in order to enable the driver to recognize that the stay mode is in preparation.

The control for stay mode preparation, which is executed by the stay mode entrance controller 102, may be constituted by a procedure for operating a part of functions required in the stay mode before the vehicle arrives at a place for the stay mode.

For example, the control for stay mode preparation by the stay mode entrance controller 102 may be constituted by a procedure for sending, to a battery controller 120, a command signal for controlling the battery controller 120 to manage a battery SoC at a higher level than a reference value, and sending, to an air conditioning controller 130, a command signal for controlling the air conditioning controller 130 to adjust an indoor temperature of the vehicle to a predetermined temperature suitable for the stay mode. Before the vehicle arrives at a place for the stay mode, accordingly, the battery SoC may be adjusted to a higher level, and the indoor temperature may be adjusted to the predetermined temperature.

For example, the control for determining whether or not entrance to the stay mode is desired, which is executed by the stay mode entrance controller 102, may be constituted by a procedure for determining that the vehicle is in a stopped state, based on a signal generated from a shift controller 140 during driving of the vehicle, when a gear shift is at a P stage (i.e., in park), and then displaying, on the display device 110, information representing whether or not entrance to the stay mode is desired, in order to enable the driver to select whether or not entrance to the stay mode is desired.

Alternatively, the control for determining whether or not entrance to the stay mode is desired, which is executed by the stay mode entrance controller 102, may be constituted by a procedure for displaying, on the display device 110, information representing whether or not entrance to the stay mode is desired, in order to enable the driver to select whether or not entrance to the stay mode is desired, when the stay mode entrance controller 120 receives, from a navigation device 160, a signal indicating that the vehicle has arrived at a recommended place for stay mode availability or a stay mode place previously set by the driver.

Preferably, the stay mode entrance controller 102 may be configured to execute control for displaying, on the display device 110, the reason why entrance to the stay mode is disabled, when entrance to the stay mode is disabled, in order to enable the driver to recognize the reason why entrance to the stay mode is disabled, and then to release the stay mode.

For example, the stay mode entrance controller 102 may be configured to execute control for displaying, on the display device 110, a state in which one of the controllers necessary for the stay mode has failed or malfunctioned, as the stay mode entrance impossibility reason, and then to release the stay mode.

The stay mode operation controller 103 is configured to execute control for informing of a stay mode entrance state, when entrance to the stay mode is selected by the driver, control for switching the vehicle to a driving disabled state, and control for executing functions required in the stay mode.

For example, the control for informing of a stay mode entrance state, which is executed by the stay mode operation controller 103, may be constituted by a procedure for displaying the stay mode entrance state on the display device 110 in order to enable the driver to accurately recognize the stay mode entrance state.

For example, the control for switching the vehicle to the driving disabled state, which is executed by the stay mode operation controller 103, may be constituted by a procedure for sending, to the brake controller 150, a command signal for controlling the brake controller 150 to operate an electronic parking brake (EPB) in order to enable the vehicle to be safely parked at the stay mode place, and a procedure for displaying the driving disabled state on the display device 110 in order to enable the driver to recognize the driving disabled state.

For example, the control for executing functions required in the stay mode, which is executed by the stay mode operation controller 103, may be constituted by a procedure for driving those usable in the stay mode among electric parts and convenience devices.

In more detail, the control for executing functions required in the stay mode, which is executed by the stay mode operation controller 103, may include a seat relaxation control for changing a posture of a motor-driven seat to a relaxation posture, control for driving a massage device built in a seatback, control for adjusting an indoor temperature to an optimal temperature in accordance with an outdoor air temperature, control for adjusting brightness of an indoor lighting device to a predetermined level, etc. Thereby, the indoor residence space of the vehicle may be formed into a comfortable space for rest, sleeping, etc. at the stay mode place.

The stay mode release controller 104 is configured to execute stay mode release control when a predetermined stay mode time ends or in accordance with a stay mode release intention of the driver.

For example, the stay mode release controller 104 may execute stay mode release control including a procedure for displaying stay mode release on the display device 110, a procedure for sending, to the brake controller 150, a command signal for controlling the brake controller 150 to release operation of the electronic parking brake (EPB) in order to enable the vehicle to be driven, and a procedure for sending, to the shift controller 140, a command signal for controlling the shift controller 140 to change the gear shift to the P stage or maintain the gear shift at the P stage, for safe driving waiting, when the predetermined stay mode time ends.

Alternatively, the stay mode release controller 104 may execute stay mode release control including a procedure for displaying stay mode release on the display device 110, a procedure for sending, to the brake controller 150, a command signal for controlling the brake controller 150 to release operation of the electronic parking brake (EPB) in order to enable the vehicle to be driven, and a procedure for sending, to the shift controller 140, a command signal for controlling the shift controller 140 to change the gear shift to the P stage or maintain the gear shift at the P stage, for safe driving waiting, when the stay mode release controller 104 receives a shift lever manipulation signal by the driver from the shift controller 130 or a brake manipulation signal by the driver from a brake pedal sensor 170.

Hereinafter, an embodiment of a stay mode control method of the electrified vehicle according to the present disclosure will be described in a sequential manner.

Figure 2:
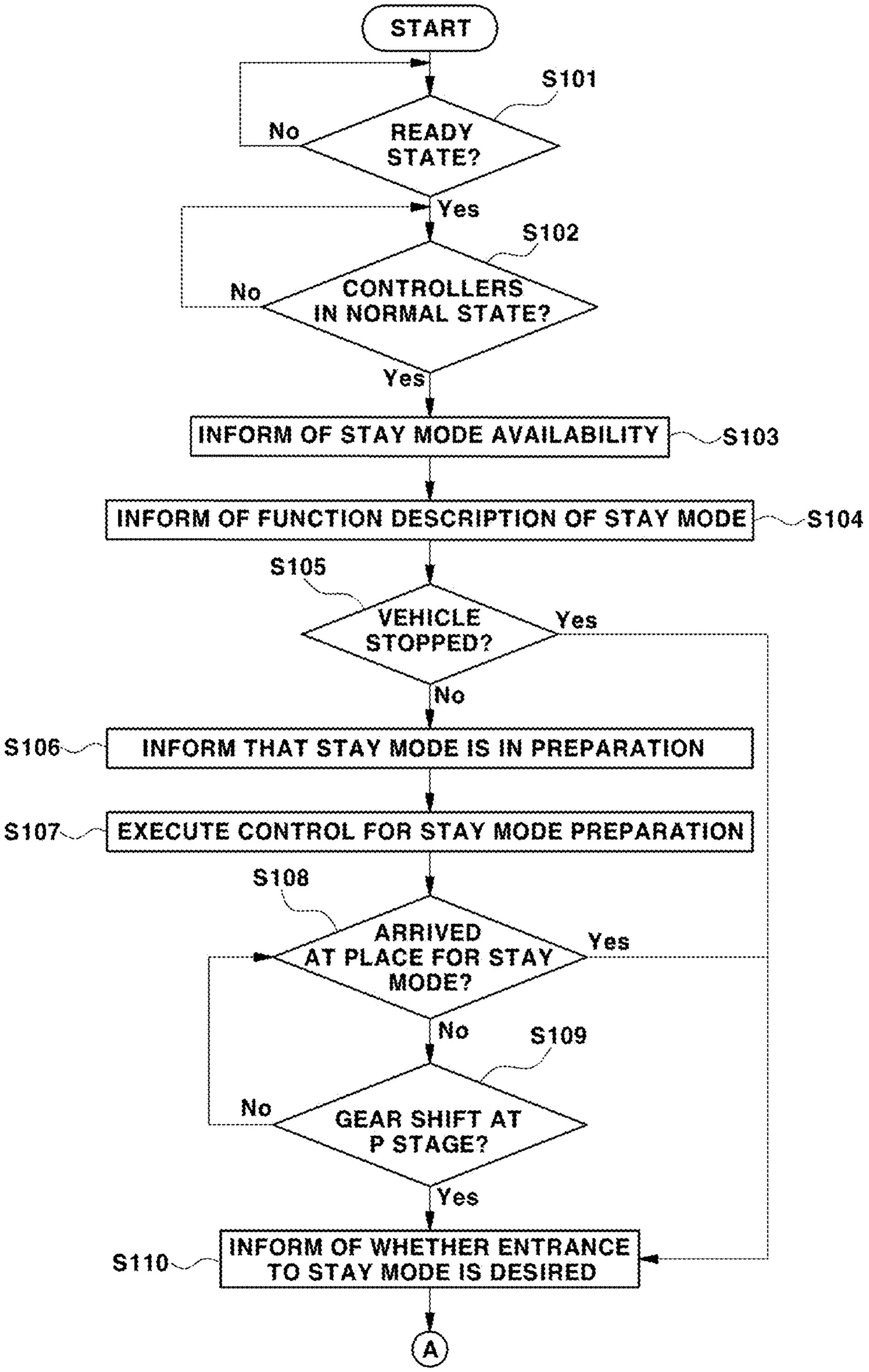
FIGS. 2 and 3 are flow charts showing a stay mode control method of an electrified vehicle according to the present disclosure.
Figure 3:
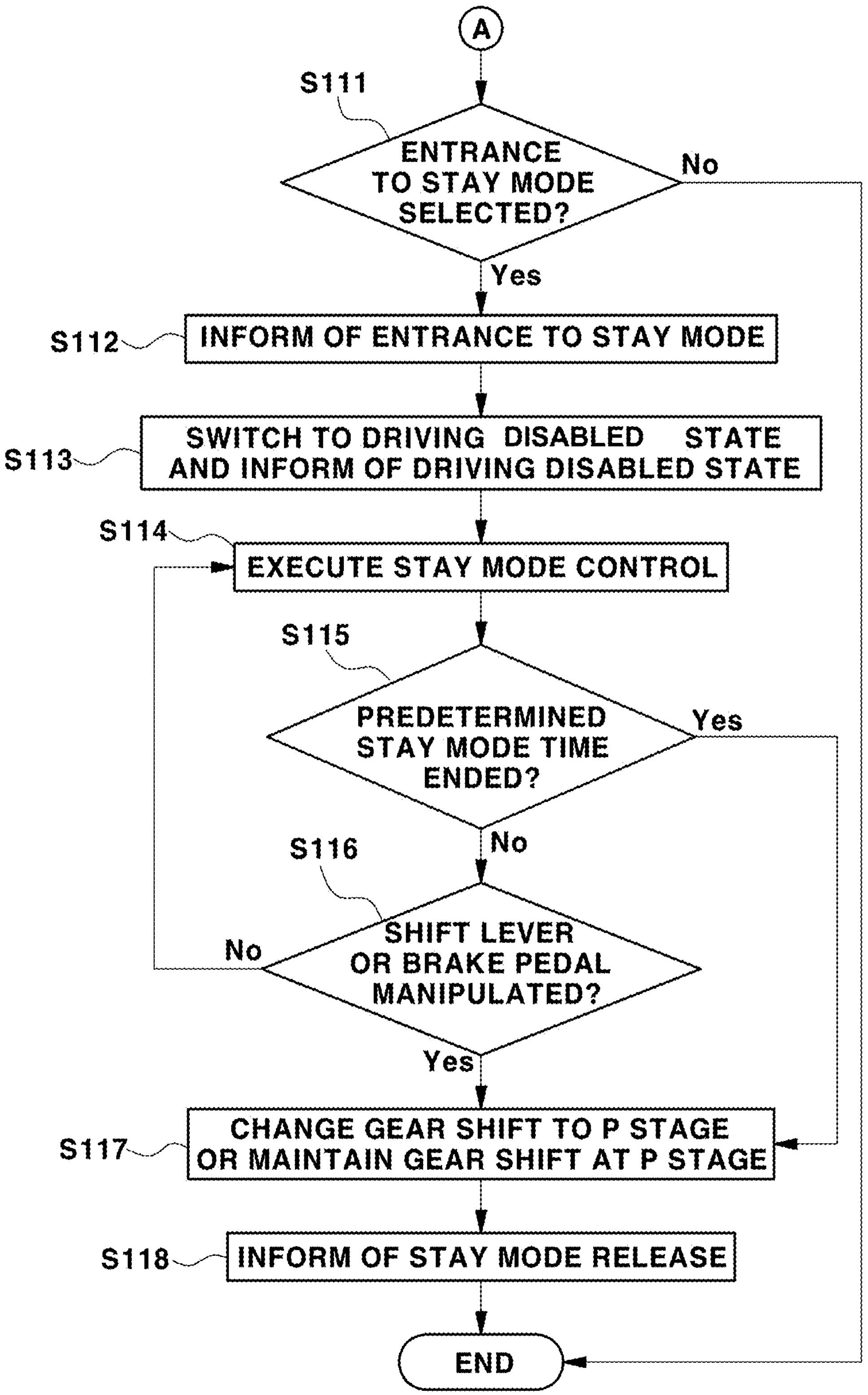

FIGS. 2 and 3 are flow charts showing the stay mode control method of the electrified vehicle according to the present disclosure.

First, a step S101 of determining whether or not the electrified vehicle is in a ready state, and a step S102 of determining whether or not all controllers necessary for a stay mode are in a normal state are executed.

For example, when the driver in the vehicle presses the start button, the vehicle enters a ready state in which the vehicle can be driven. The stay preparation mode controller 101 may recognize the ready state as a vehicle start state. When normal output signals are subsequently output from the controllers necessary for the stay mode to the stay preparation mode controller 101, the stay preparation mode controller 101 may determine that all the controllers necessary for the stay mode are in a normal state.

Thereafter, the stay preparation mode controller 101 not only recognizes a vehicle start condition, but also executes stay mode availability notification control when all the controllers necessary for the stay mode are in a normal state (S103).

For example, when the stay preparation mode controller 101 recognizes the vehicle start condition and all the controllers necessary for the stay mode are in a normal state, the stay preparation mode controller 101 may execute the stay mode availability notification control to activate a button enabling the driver to manipulate the stay mode or to display stay mode availability on a display device 110 in the form of a modal popup. Accordingly, the driver may recognize that the stay mode is in preparation.

Subsequently, the stay preparation mode controller 101 executes stay mode function description notification control (S104).

For example, the stay preparation mode controller 101 may execute the stay mode function description notification control to display a simple function description of the stay mode on the display device 110 in the form of a modal popup for a driver unfamiliar with the stay mode.

At this time, a step of determining whether or not the vehicle is in a stopped state may be executed (S105).

For example, the stay mode entrance controller 102 may determine that the vehicle is in a stopped state, upon determining that the gear shift is at the P stage, based on a signal generated from the shift controller 140 during driving of the vehicle.

Upon determining in step S105 that the vehicle is not in a stopped state, that is, when the vehicle is still being driven, the stay mode entrance controller 102 executes control for informing that the stay mode is in preparation (S106).

For example, the control for informing that the stay mode is in preparation, which is executed by the stay mode entrance controller 102, may be constituted by a procedure for displaying, on the display device 110, that the stay mode is in preparation, in the form of a modal popup, in order to enable the driver to recognize that the stay mode is in preparation.

Subsequently, the stay mode entrance controller 102 executes control for stay mode preparation before the vehicle arrives at a place for the stay mode (S107).

For example, as the control for stay mode preparation by the stay mode entrance controller 102, a command signal is sent from the stay mode entrance controller 102 to the battery controller 120, to control the battery controller 120 to manage a battery SoC at a higher level than a reference value. Accordingly, the battery SoC increases in accordance with an increase in regenerative braking torque of a motor and, as such, battery SoC increasing adjustment may be achieved before the vehicle arrives at the place for the stay mode. Thus, when the vehicle arrives at the stay mode place, the driver may easily use various electronic appliances for rest, using battery power.

In addition, as the control for stay mode preparation by the stay mode entrance controller 102, a command signal is sent from the stay mode entrance controller 102 to the air conditioning controller 130, to control the air conditioning controller 130 to adjust an indoor temperature of the vehicle to a predetermined temperature suitable for the stay mode and, as such, the indoor temperature of the vehicle may be adjusted to a desired temperature before the vehicle arrives at the stay mode place. Thus, when the vehicle arrives at the stay mode place, the driver may sleep or the like at an appropriate indoor temperature.

Next, the stay mode entrance controller 102 determines whether or not the vehicle has arrived at the place for the stay mode, in order to determine whether or not entrance to the stay mode is desired.

For example, when the stay mode entrance controller 120 receives, from the navigation device 160, a signal indicating that the vehicle has arrived at a recommended place for stay mode availability or a stay mode place previously set by the driver, the stay mode entrance controller 120 may determine that the vehicle has arrived at the place for the stay mode.

Upon determining that the vehicle has arrived at the place for the stay mode, based on determination results in step S108, the stay mode entrance controller 102 executes control for displaying, on the display device 110, information representing whether or not entrance to the stay mode is desired, in order to determine whether or not entrance to the stay mode is desired, that is, to enable the driver to select whether or not entrance to the stay mode is desired (S110).

After determining that the vehicle has not arrived at the place for stay mode yet, based on determination results of step S108, that is, when the vehicle is still being driven, the stay mode entrance controller 102 determines whether or not the gear shift is at the P stage, based on a signal from the shift controller 140 (S109).

Upon determining that the gear shift is at the P stage, based on determination results of step S109, the stay mode entrance controller 102 determines that the vehicle has arrived at the place for the stay mode, and then executes control for displaying, on the display device 110, information representing whether or not entrance to the stay mode is desired, in order to enable the driver to select whether or not entrance to the stay mode is desired, as in step S110 (S110).

Thereafter, the stay mode operation controller 103 determines whether or not entrance to the stay mode has been selected by the driver (S111).

For example, the stay mode operation controller 103 determines whether or not the driver has manipulated the button for entrance to the stay mode or determines whether or not the driver has selectively manipulated a menu for entrance to the stay mode, which is disposed on the display device 110, after recognizing information representing whether or not entrance to the stay mode is desired, which is displayed on the display device 110.

Subsequently, the stay mode operation controller 103 ends the stay mode control when entrance to the stay mode is not selected by the driver, whereas the stay mode operation controller 103 executes stay mode entrance notification control when entrance to the stay mode is selected by the driver (S112).

For example, the control for informing of a stay mode entrance state, which is executed by the stay mode operation controller 103, may be constituted by a procedure for displaying a stay mode entrance state on the display device 110 in order to enable the driver to accurately recognize the stay mode entrance state.

Subsequently, control for switching the vehicle to a driving disabled state and informing of the driving disabled state is executed by the stay mode operation controller 103 (S113).

For example, controls for operating an electronic parking brake (EPB) under control of the braking controller 150 according to a command from the stay mode operation controller 103, in order to maintain the vehicle in a safely parked state at the stay mode place, and displaying the driving disabled state on the display device 110 in order to enable the driver to recognize the driving disabled state may be executed.

Thereafter, a stay mode control for executing functions required in the stay mode is executed by the stay mode operation controller 103 (S114).

For example, the stay mode control for executing functions required in the stay mode may include a seat relaxation control for changing a posture of a motor-driven seat to a relaxation posture, control for driving a massage device built in a seatback, control for adjusting an indoor temperature to an optimal temperature in accordance with an outdoor air temperature, control for adjusting brightness of an indoor lighting device to a predetermined level, etc. Thereby, the indoor residence space of the vehicle may be formed into a comfortable space for rest, sleeping, etc. at the stay mode place.

Next, the stay mode release controller 104 determines whether or not a predetermined stay mode time has ended (S115).

Upon determining that the predetermined stay mode time has ended, based on determination results of step S115, the stay mode release controller 104 executes stay mode release control to change the gear shift to the P stage or to maintain the gear shift at the P stage (S117).

For example, the stay mode release control, which is executed by the stay mode release controller 104 includes a procedure for displaying stay mode release on the display device 110, for recognition of stay mode release by the driver, a procedure for releasing operation of the electronic parking brake (EPB) under control of the braking controller 150 according to a command from the stay mode release controller 104 in order to enable the vehicle to be driven, and a procedure for changing the gear shift to the P stage or maintaining the gear shift at the P stage under control of the shift controller 140 according to a command from the stay mode release controller 104, for safe driving waiting after stay mode release.

Upon determining that the predetermined stay mode time has not ended yet, based on determination results of step S115, the stay mode release controller 104 determines whether or the shift lever has been manipulated by the driver or the brake pedal has been manipulated by the driver (S116).

Upon determining that the shift lever has been manipulated by the driver or the brake pedal has been manipulated by the driver, based on determination results of step S116, the stay mode release controller 104 executes the stay mode release control, thereby changing the gear shift to the P stage or maintaining the gear shift at the P stage (S117).

In detail, upon determining that the shift lever has been manipulated by the driver or the brake pedal has been manipulated by the driver, based on determination results of step S116, the stay mode release controller 104 executes the stay mode release control, which includes a procedure for displaying stay mode release on the display device 110, for recognition of stay mode release by the driver, a procedure for releasing operation of the electronic parking brake (EPB) under control of the braking controller 150 according to a command from the stay mode release controller 104 in order to enable the vehicle to be driven, and a procedure for changing the gear shift to the P stage or maintaining the gear shift at the P stage under control of the shift controller 140 according to a command from the stay mode release controller 104, for safe driving waiting after stay mode release.

Finally, the stay mode release controller 104 executes control for displaying information representing a release state of the stay mode on the display device 110 in order to enable the driver to recognize the stay mode release state (S118).

As apparent from the above description, the stay preparation mode entrance procedure, the stay mode entrance procedure, the stay mode control procedure for executing functions required in the stay mode, the procedure for releasing the stay mode after entrance to the stay mode control, etc. are automatically executed while being informed to the driver through the display device or the like. Accordingly, it may be possible to enhance convenience of stay mode use and marketability of stay mode technology.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A stay mode control system of an electrified vehicle comprising:

a stay preparation mode controller configured to determine whether all controllers of a stay mode are in a normal state when the vehicle starts;

a stay mode entrance controller configured to execute control for informing a driver that the stay mode is in preparation, control for stay mode preparation, and control for determining whether entrance to the stay mode is desired;

a stay mode operation controller configured to execute control for informing of a stay mode entrance state, control for switching the vehicle to a driving disabled state, and control for executing required functions in the stay mode; and a stay mode release controller configured to execute stay mode release control when a predetermined stay mode time ends, or in accordance with a stay mode release intention of the driver.

2. The stay mode control system according to claim 1, wherein the stay preparation mode controller is configured to:

recognize, as a vehicle start state, a ready state of the vehicle that is a driving waiting state in response to depression of a start button by the driver; and determine that all controllers of the stay mode are in the normal state, upon receiving normal output signals from the controllers of the stay mode.

3. The stay mode control system according to claim 1, wherein the stay preparation mode controller is configured to:

execute stay mode availability notification control for activating a button enabling the driver to manipulate the stay mode or displaying stay mode availability on a display device as a modal popup; and execute stay mode function description notification control for displaying a function description of the stay mode on the display device as a modal popup, when all the controllers of the stay mode are in a normal state.

4. The stay mode control system according to claim 1, wherein the control for informing that the stay mode is in preparation, which is executed by the stay mode entrance controller, comprises displaying, on a display device, that the stay mode is in preparation as a modal popup, in order to enable the driver to recognize that the stay mode is in preparation.

5. The stay mode control system according to claim 1, wherein the control for stay mode preparation, which is executed by the stay mode entrance controller, comprises operating a part of functions required in the stay mode before the vehicle arrives at a place for the stay mode.

6. The stay mode control system according to claim 1, wherein the control for determining whether entrance to the stay mode is desired, which is executed by the stay mode entrance controller, comprises displaying, on a display device, information representing whether entrance to the stay mode is desired, upon receiving, from a shift controller, a signal indicating that a gear shift is at a P stage, or receiving, from a navigation device, a signal indicating that the vehicle has arrived at a place for the stay mode.

7. The stay mode control system according to claim 1, wherein the stay mode entrance controller is configured to execute control for displaying, on a display device, a reason why entrance to the stay mode is disabled, when entrance to the stay mode is disabled, and releasing the vehicle from the stay mode.

8. The stay mode control system according to claim 1, wherein:

the control for informing of a stay mode entrance state, which is executed by the stay mode operation controller, comprises displaying the stay mode entrance state on a display device; and the control for executing functions required in the stay mode, which is executed by the stay mode operation controller, comprises operating an electronic parking brake, and a procedure for driving electric parts and convenience devices usable in the stay mode among all electric parts and all convenience devices.

9. The stay mode control system according to claim 1, wherein the stay mode release controller is configured to execute stay mode release control comprising: displaying stay mode release on a display device;

sending, to a brake controller, a command signal for controlling the brake controller to release operation of an electronic parking brake; and sending, to a shift controller, a command signal for controlling the shift controller to change a gear shift to a P stage or maintain the gear shift at the P stage, when the predetermined stay mode time ends.

10. The stay mode control system according to claim 1, wherein the stay mode release controller is configured to execute stay mode release control comprising: displaying stay mode release on a display device;

sending, to a brake controller, a command signal for controlling the brake controller to release operation of an electronic parking brake; and sending, to a shift controller, a command signal for controlling the shift controller to change a gear shift to a P stage or maintain the gear shift at the P stage, when the stay mode release controller receives a shift lever manipulation signal by the driver from the shift controller or a brake manipulation signal by the driver from a brake pedal sensor.

11. A stay mode control method of an electrified vehicle comprising:

determining, by a stay preparation mode controller, whether all controllers of a stay mode are in a normal state, when the vehicle starts;

executing, by a stay mode entrance controller, control for informing a driver that the stay mode is in preparation, control for stay mode preparation, and control for determining whether entrance to the stay mode is desired;

executing, by a stay mode operation controller, control for informing of a stay mode entrance state, control for switching the vehicle to a driving disabled state, and control for executing functions required in the stay mode; and executing, by a stay mode release controller, stay mode release control when a predetermined stay mode time ends or in accordance with a stay mode release intention of the driver.

12. The stay mode control method according to claim 11, wherein the stay preparation mode controller recognizes, as a vehicle start state, a ready state of the vehicle that is a driving waiting state according to depression of a start button by the driver, and determines that all controllers of the stay mode are in the normal state, upon receiving normal output signals from the controllers of the stay mode.

13. The stay mode control method according to claim 11, wherein, when all the controllers of the stay mode are in a normal state, stay mode availability notification control for activating a button enabling the driver to manipulate the stay mode or displaying stay mode availability on a display device as a modal popup, and stay mode function description notification control for displaying a function description of the stay mode on the display device as a modal popup are executed by the stay preparation mode controller.

14. The stay mode control method according to claim 11, wherein the control for informing that the stay mode is in preparation, which is executed by the stay mode entrance controller, comprises displaying, on a display device, that the stay mode is in preparation, as a modal popup, in order to enable the driver to recognize that the stay mode is in preparation.

15. The stay mode control method according to claim 11, wherein the control for stay mode preparation, which is executed by the stay mode entrance controller, comprises operating a part of functions required in the stay mode before the vehicle arrives at a place for the stay mode.

16. The stay mode control method according to claim 11, wherein the control for determining whether entrance to the stay mode is desired, which is executed by the stay mode entrance controller, comprises displaying, on a display device, information representing whether entrance to the stay mode is desired, upon receiving, from a shift controller, a signal indicating that a gear shift is at a P stage, or receiving, from a navigation device, a signal indicating that the vehicle has arrived at a place for the stay mode.

17. The stay mode control method according to claim 11, wherein the stay mode entrance controller executes control for displaying, on a display device, a reason why entrance to the stay mode is disabled, when entrance to the stay mode is disabled, and releases the vehicle from the stay mode.

18. The stay mode control method according to claim 11, wherein:

the control for informing of a stay mode entrance state, which is executed by the stay mode operation controller, comprises displaying the stay mode entrance state on a display device; and the control for executing functions required in the stay mode, which is executed by the stay mode operation controller, comprises operating an electronic parking brake, and driving electric parts and convenience devices usable in the stay mode among all electric parts and all convenience devices.

19. The stay mode control method according to claim 11, wherein the executing stay mode release control comprises:

displaying stay mode release on a display device;

sending, to a brake controller, a command signal for controlling the brake controller to release operation of an electronic parking brake; and sending, to a shift controller, a command signal for controlling the shift controller to change a gear shift to a P stage or maintain the gear shift at the P stage, when the predetermined stay mode time ends.

20. The stay mode control method according to claim 11, wherein the executing stay mode release control comprises:

displaying stay mode release on a display device;

sending, to a brake controller, a command signal for controlling the brake controller to release operation of an electronic parking brake; and sending, to a shift controller, a command signal for controlling the shift controller to change a gear shift to a P stage or maintain the gear shift at the P stage, upon receiving a shift lever manipulation signal by the driver from the shift controller or a brake manipulation signal by the driver from a brake pedal sensor.

* * * * *